United States Patent
Shan

(10) Patent No.: US 11,642,703 B2
(45) Date of Patent: May 9, 2023

(54) CLEANING APPARATUS AND SYSTEM

(71) Applicant: HKC CORPORATION LIMITED, Shenzhen (CN)

(72) Inventor: Jianfeng Shan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 1028 days.

(21) Appl. No.: 16/461,374

(22) PCT Filed: Nov. 7, 2018

(86) PCT No.: PCT/CN2018/114284
§ 371 (c)(1),
(2) Date: May 16, 2019

(87) PCT Pub. No.: WO2020/082423
PCT Pub. Date: Apr. 30, 2020

(65) Prior Publication Data
US 2020/0376521 A1    Dec. 3, 2020

(30) Foreign Application Priority Data
Oct. 24, 2018 (CN) .......................... 201821731178.3

(51) Int. Cl.
*B08B 1/02* (2006.01)
*B08B 3/14* (2006.01)
*B08B 11/04* (2006.01)

(52) U.S. Cl.
CPC .................. *B08B 1/02* (2013.01); *B08B 3/14* (2013.01); *B08B 11/04* (2013.01)

(58) Field of Classification Search
CPC ........... B08B 1/02; B08B 11/04; B08B 3/022; B08B 3/123; B08B 3/14; C03C 23/0075
See application file for complete search history.

(56) References Cited

U.S. PATENT DOCUMENTS

| 1,697,879 | A | * | 1/1929 | Olson | ................... A47L 15/245 |
| | | | | | 134/68 |
| 4,327,756 | A | * | 5/1982 | Rath | ......................... B08B 9/30 |
| | | | | | 134/152 |
| 2005/0273955 | A1 | * | 12/2005 | Rogus | ....................... B08B 1/02 |
| | | | | | 15/88.1 |

FOREIGN PATENT DOCUMENTS

| CN | 201320538 Y | 10/2003 |
| CN | 201064785 Y | 5/2008 |
| CN | 205701561 U | 11/2016 |
| CN | 107030034 A | 8/2017 |
| CN | 206405078 U | 8/2017 |
| WO | WO2018039394 A | 3/2018 |

OTHER PUBLICATIONS

Ping Li, the ISA written comments, dated Mar. 2019, CN.

* cited by examiner

*Primary Examiner* — Douglas Lee

(57) ABSTRACT

The present application discloses a cleaning apparatus and system, including: a transmission assembly; a drive assembly, connected to the transmission assembly and located lower than the transmission assembly; a cleaning assembly, located higher than the transmission assembly; and a waterproof structure, located between the drive assembly and the cleaning assembly.

10 Claims, 7 Drawing Sheets

800 Cleaning system

100 Cleaning apparatus

FIG. 9

CLEANING APPARATUS AND SYSTEM

The present application claims priority to Chinese Patent No. CN201821731178.3 filed with the Chinese Patent Office on Oct. 24, 2018 and entitled "CLEANING APPARATUS AND SYSTEM", which is incorporated herein by reference in its entirety.

TECHNICAL FIELD

The present application relates to the field of display technologies, and in particular, to a cleaning apparatus and system.

BACKGROUND

Descriptions herein merely provide background information related to the present application and do not necessarily constitute the prior art.

With the development of the liquid crystal display (LCD) display screen industry, requirements for various technologies are becoming stricter. Cleaning during an LCD display manufacturing process is precision cleaning. To achieve a good cleaning effect, functions such as clarity, cleanliness, and an anti-static function are also increasing. To select a cleaning agent, two aspects need to be considered. In one aspect, a cleaning agent with an optimal chemical effect needs to be selected based on the nature of the dirt. In the other aspect, a cleaning agent with a proper surface tension, vapor pressure, and viscosity needs to be selected, because when an ultrasonic cleaning method is used, and these characteristics are related to intensity of ultrasonic cavitation. A large surface tension of a liquid does not easily cause cavitation, but when sound intensity exceeds a cavitation threshold, considerable energy is released by a cavitation bubble collapse. This is favorable for cleaning. A liquid with a high vapor pressure reduces cavitation strength, and a large viscosity of the liquid does not easily cause cavitation. Therefore, a cleaning agent having a high vapor pressure and a high viscosity is disadvantageous for ultrasonic cleaning. Further, a static pressure of the cleaning agent affects the cleaning effect. When the static pressure of the cleaning agent is large, cavitation is less likely to occur, so that the ultrasonic cleaning or treatment in a sealed pressurized container is worse.

Before coating of an alignment film and during operation of a cleaning machine, the liquid from a brush section is sprayed into gears on both sides, and the gears are worn out. Generated scraps are washed away by the liquid, are recycled to a reservoir through a pipe, and return to an upper cleaning substrate again under action of a pump. The scraps remain at a filter element, clogging the filter element. As a result, a service life (one day) is much lower than a normal level (seven days). The known technology is to connect a recycling pipe and a waste liquid pipe at the gears on both sides. A splashed liquid is directly discharged and does not participate in recycling. The exemplary technology wastes materials and increases costs.

SUMMARY

In view of the foregoing defects, the present application is to provide a cleaning apparatus and system that reduce wastes of materials and costs.

To achieve the foregoing objective, the present application provides a cleaning apparatus, the cleaning apparatus including: a transmission assembly, transmitting a to-be-cleaned object; a drive assembly, connected to the transmission assembly, located lower than the transmission assembly, and driving the transmission assembly; a cleaning assembly, located higher than the transmission assembly, and cleaning the to-be-cleaned object; and a waterproof structure, located between the drive assembly and the cleaning assembly, blocking the drive assembly, and preventing a cleaning agent from coming into contact with the drive assembly.

The present application further discloses a cleaning apparatus, the cleaning apparatus including: a transmission assembly, transmitting a to-be-cleaned object; a drive assembly, connected to the transmission assembly, located lower than the transmission assembly, and driving the transmission assembly; a cleaning assembly, located higher than the transmission assembly, and cleaning the to-be-cleaned object; a waterproof structure, located between the drive assembly and the cleaning assembly, blocking the drive assembly, and preventing a cleaning agent from coming into contact with the drive assembly; and the cleaning apparatus including a machine platform, the machine platform being located lower than the transmission assembly and inside a side wall of the cleaning apparatus, one end of the waterproof structure being fixedly connected to the machine platform, and the other end of the waterproof structure being fixedly connected to the side wall of the cleaning apparatus, where the waterproof structure includes a locking member and at least two baffle plates, the at least two baffle plates are connected to each other and are mounted to the cleaning apparatus in parallel, the at least two baffle plates cover and are located higher than the drive assembly, and the locking member is detachably connected to a position at which the at least two baffle plates are connected to each other; the waterproof structure includes a flow guide member, the flow guide member is fixed to the side wall of the cleaning apparatus, the flow guide member is located higher than a junction between the baffle plate and the side wall that is of the cleaning apparatus and to which the flow guide member is fixed, and the flow guide member blocks the junction to prevent the cleaning agent from infiltrating through the junction to come into contact with the drive assembly; and the baffle plate includes a first plate and a second plate, the first plate includes a numbering structure and a portable structure, the numbering structure and the portable structure are both located on an outer side face of the first plate, and the portable structure is located in the middle of the first plate.

The present application further discloses a cleaning system, including a cleaning apparatus, the cleaning apparatus including: a transmission assembly, transmitting a to-be-cleaned object; a drive assembly, connected to the transmission assembly, located lower than the transmission assembly, and driving the transmission assembly; a cleaning assembly, located higher than the transmission assembly, and cleaning the to-be-cleaned object; and a waterproof structure, located between the drive assembly and the cleaning assembly, blocking the drive assembly, and preventing a cleaning agent from coning into contact with the drive assembly.

As is found by the inventor through research, in a production process of a display panel, cleaning is required before coating of an alignment film, and during cleaning, the transmission assembly, the drive assembly, and the cleaning assembly need to work together to complete a cleaning procedure. However, during cleaning, the cleaning agent may come into contact with the drive assembly, and scraps exist on a surface of the drive assembly. In this case, the scraps exist during recycling of the cleaning agent, and hinder the recycling of the cleaning agent, causing an increase in costs and a waste of the cleaning agent. However, when the waterproof structure is disposed between the drive assembly and the cleaning assembly, the waterproof structure can block the drive assembly, so that the cleaning agent is not in contact with the drive assembly, and therefore is not mixed with the scraps, thereby helping the recycling of the cleaning agent and reducing costs.

BRIEF DESCRIPTION OF DRAWINGS

The drawings are included to provide further understanding of embodiments of the present application, which constitute a part of the specification and illustrate the embodiments of the present application, and describe the principles of the present application together with the text description. Apparently, the accompanying drawings in the following description show merely some embodiments of the present application, and a person of ordinary skill in the art may still derive other accompanying drawings from these accompanying drawings without creative efforts. In the accompanying drawings:

FIG. 9 is a schematic diagram of the cleaning system of the present application.

DETAILED DESCRIPTION

Figure 1:
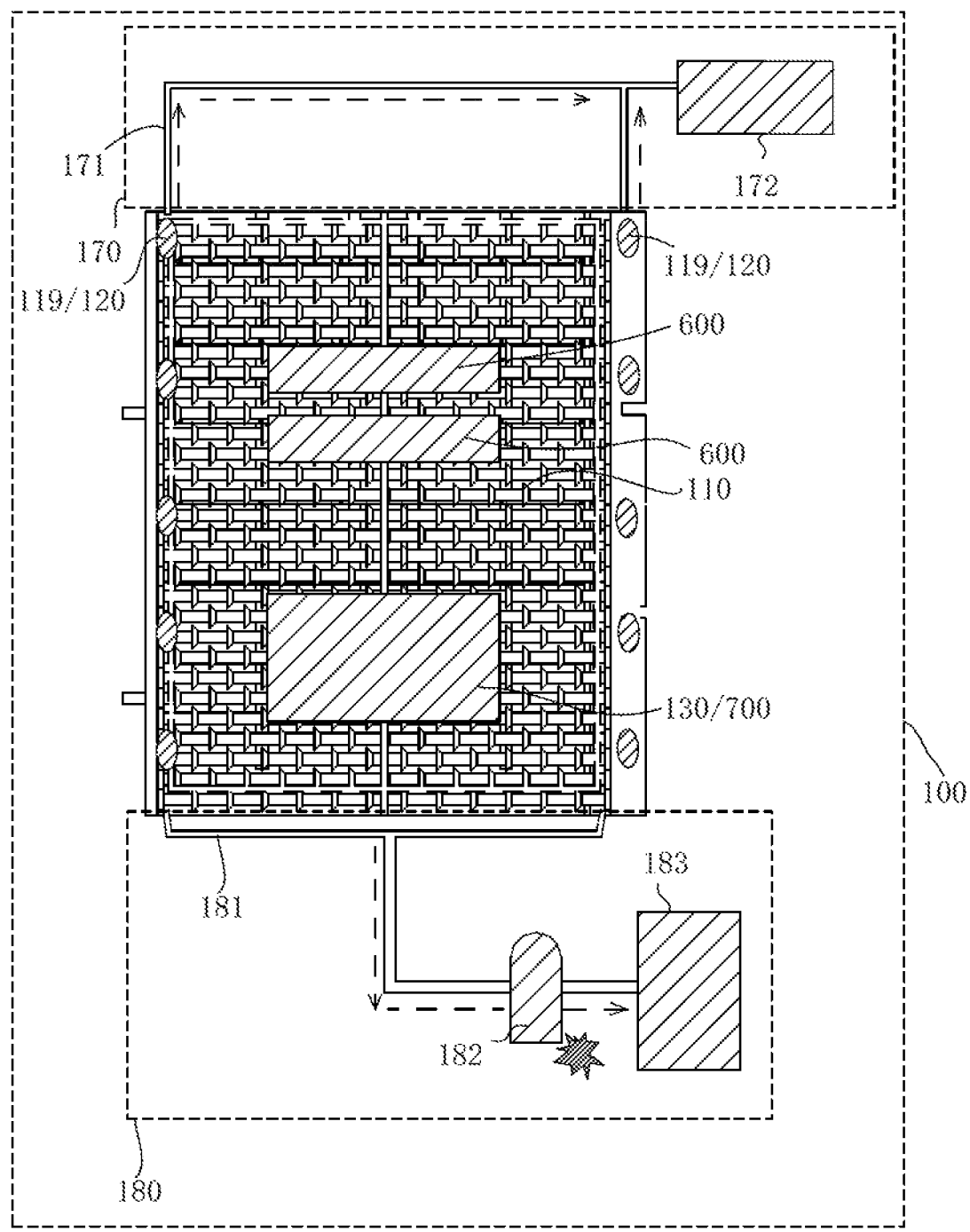
FIG. 1 is a schematic diagram of a cleaning apparatus without a waterproof structure according to an embodiment of the present application.

The specific structure and function details disclosed herein are merely representative, and are intended to describe exemplary embodiments of the present application. However, the present application can be specifically embodied in many alternative forms, and should not be interpreted to be limited to the embodiments described herein.

In the description of the present application, it should be understood that, orientation or position relationships indicated by the terms "center", "transversal", "upper", "lower", "left". "right", "vertical", "horizontal", "top", "bottom", "inner", "outer", etc. are based on the orientation or position relationships as shown in the drawings, for ease of the description of the present application and simplifying the description only, rather than indicating or implying that the indicated device or element must have a particular orientation or be constructed and operated in a particular orientation. Therefore, these terms should not be understood as a limitation to the present application. In addition, the terms such as "first" and "second" are merely for a descriptive purpose, and cannot be understood as indicating or implying a relative importance, or implicitly indicating the number of the indicated technical features. Hence, the features defined by "first" and "second" can explicitly or implicitly include one or more features. In the description of the present application, "a plurality of" means two or more, unless otherwise stated. In addition, the term "include" and any variations thereof are intended to cover a non-exclusive inclusion.

In the description of the present application, it should be understood that, unless otherwise specified and defined, the terms "install", "connected with", "connected to" should be comprehended in a broad sense. For example, these terms may be comprehended as being fixedly connected, detachably connected or integrally connected; mechanically connected or coupled; or directly connected or indirectly connected through an intermediate medium, or in an internal communication between two elements. The specific meanings about the foregoing terms in the present application may be understood by those skilled in the art according to specific circumstances.

The terms used herein are merely for the purpose of describing the specific embodiments, and are not intended to limit the exemplary embodiments. As used herein, the singular forms "a", "an" are intended to include the plural forms as well, unless otherwise indicated in the context clearly. It will be further understood that the terms "comprise" and/or "include" used herein specify the presence of the stated features, integers, steps, operations, elements and/or components, but do not preclude the presence or addition of one or more other features, integers, steps, operations, elements, components and/or combinations thereof.

The following further describes the present application with the accompanying drawings and optional embodiments.

Figure 2:
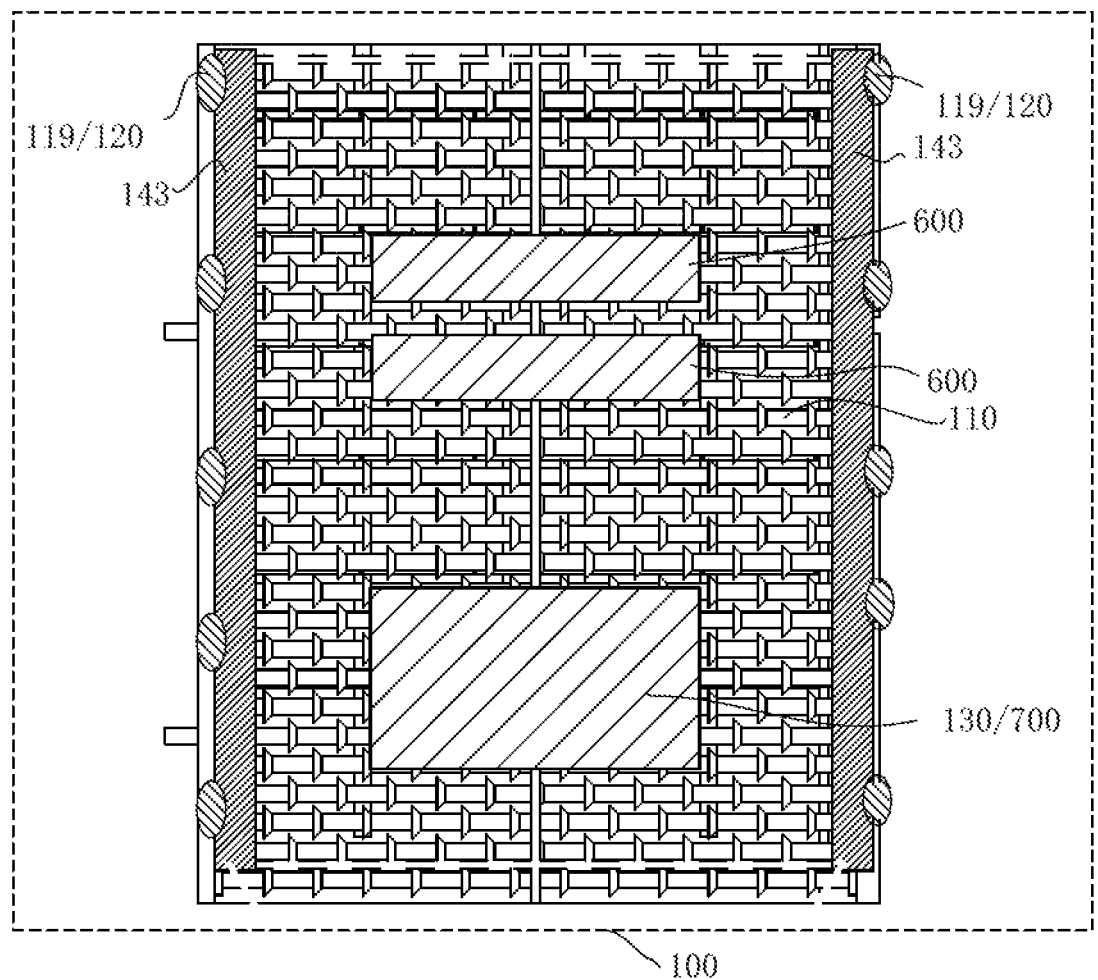
FIG. 2 is a schematic diagram of a cleaning apparatus with a flow guide member according to an embodiment of the present application.
Figure 3:
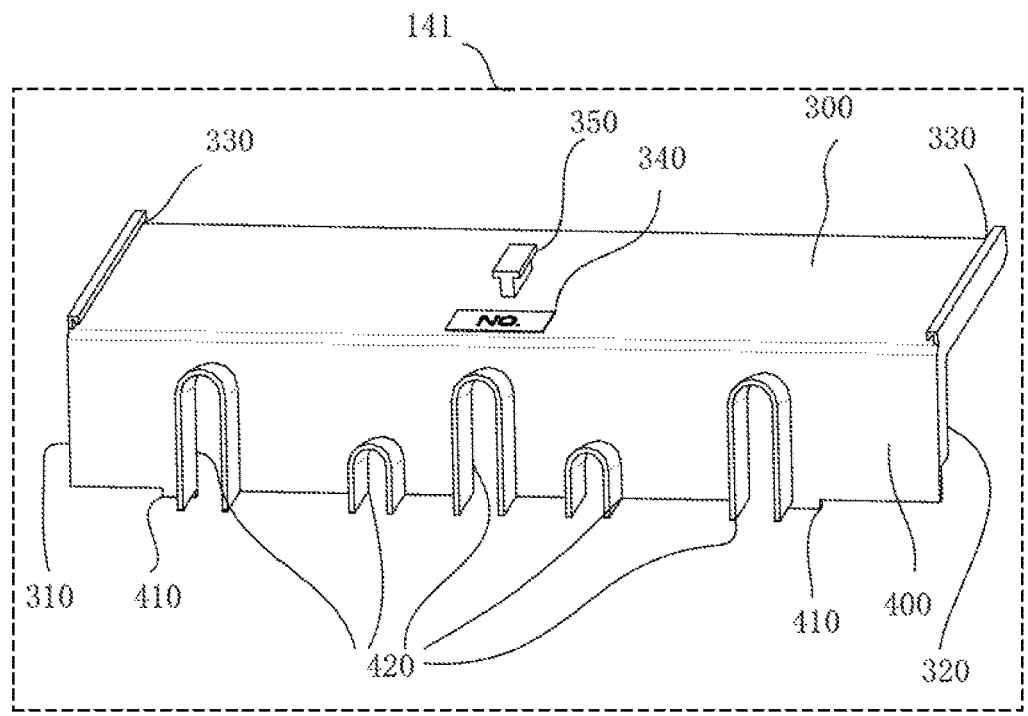
FIG. 3 is a schematic diagram of an outer side of a baffle plate according to an embodiment of the present application.
Figure 4:
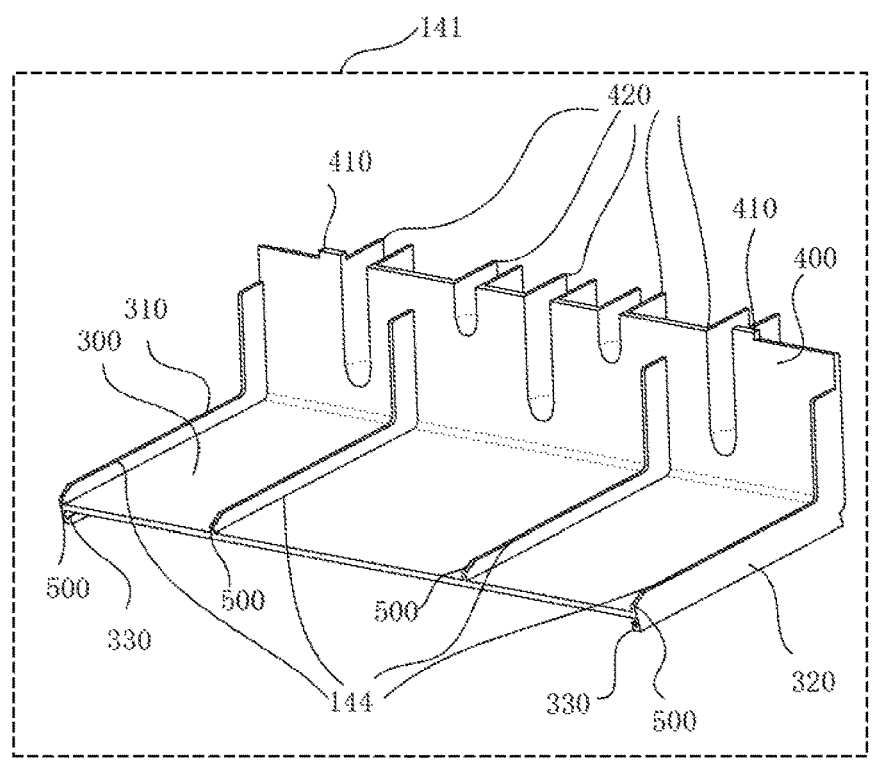
FIG. 4 is a schematic diagram of an inner side of a baffle plate according to an embodiment of the present application.
Figure 5:
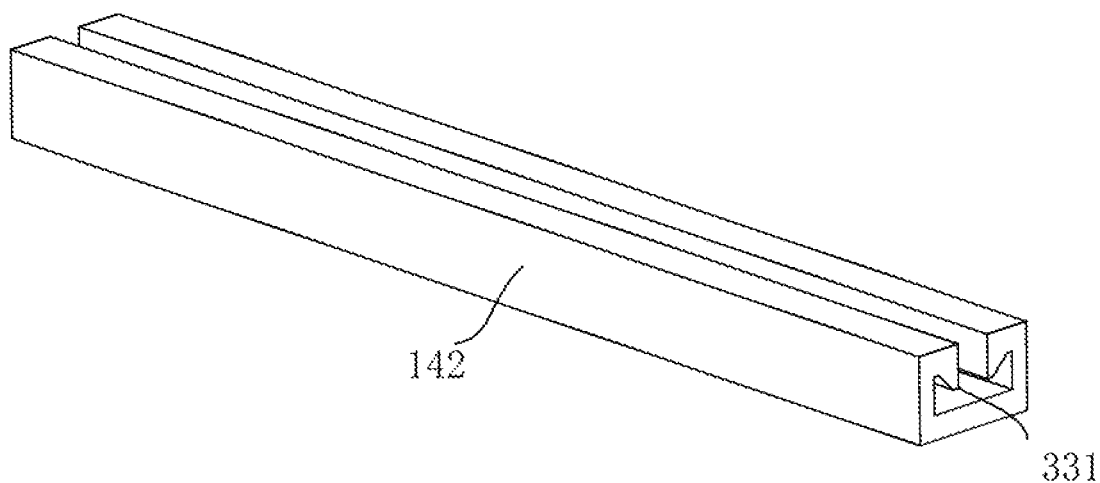
FIG. 5 is a schematic diagram of a locking member according to an embodiment of the present application.
Figure 6:
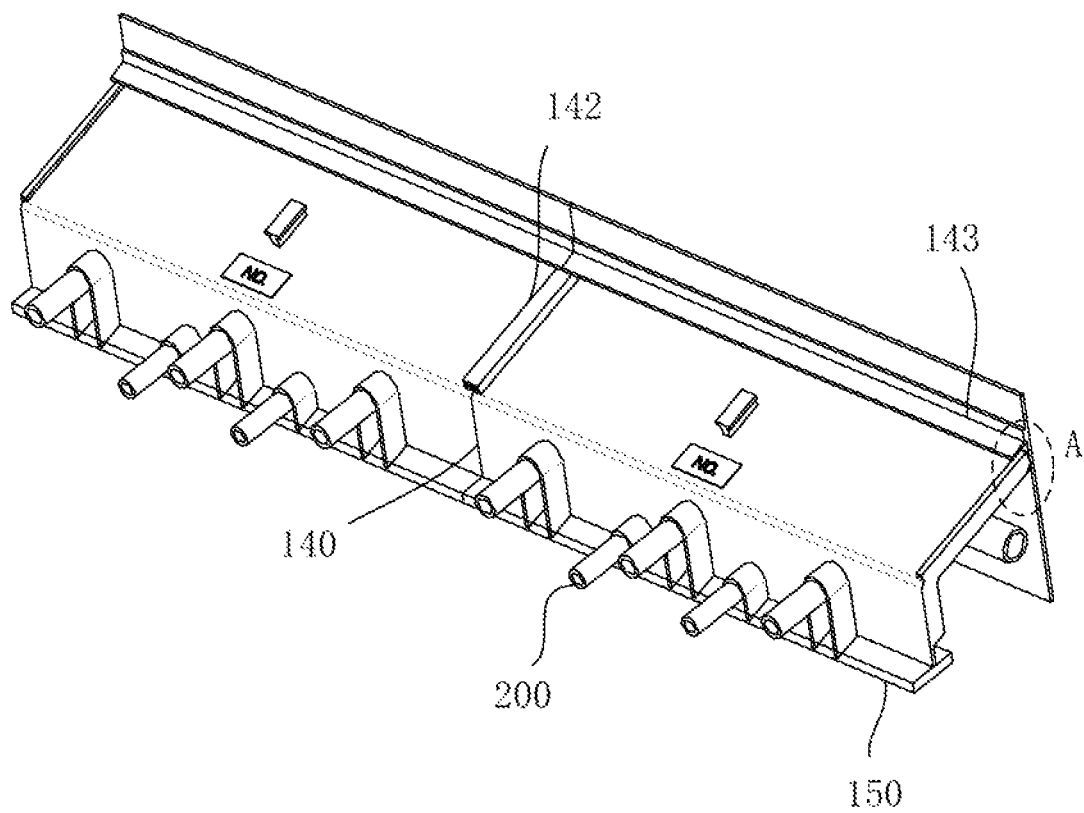
FIG. 6 is a schematic diagram of a mounted and fixed waterproof structure according to an embodiment of the present application.
Figure 7:
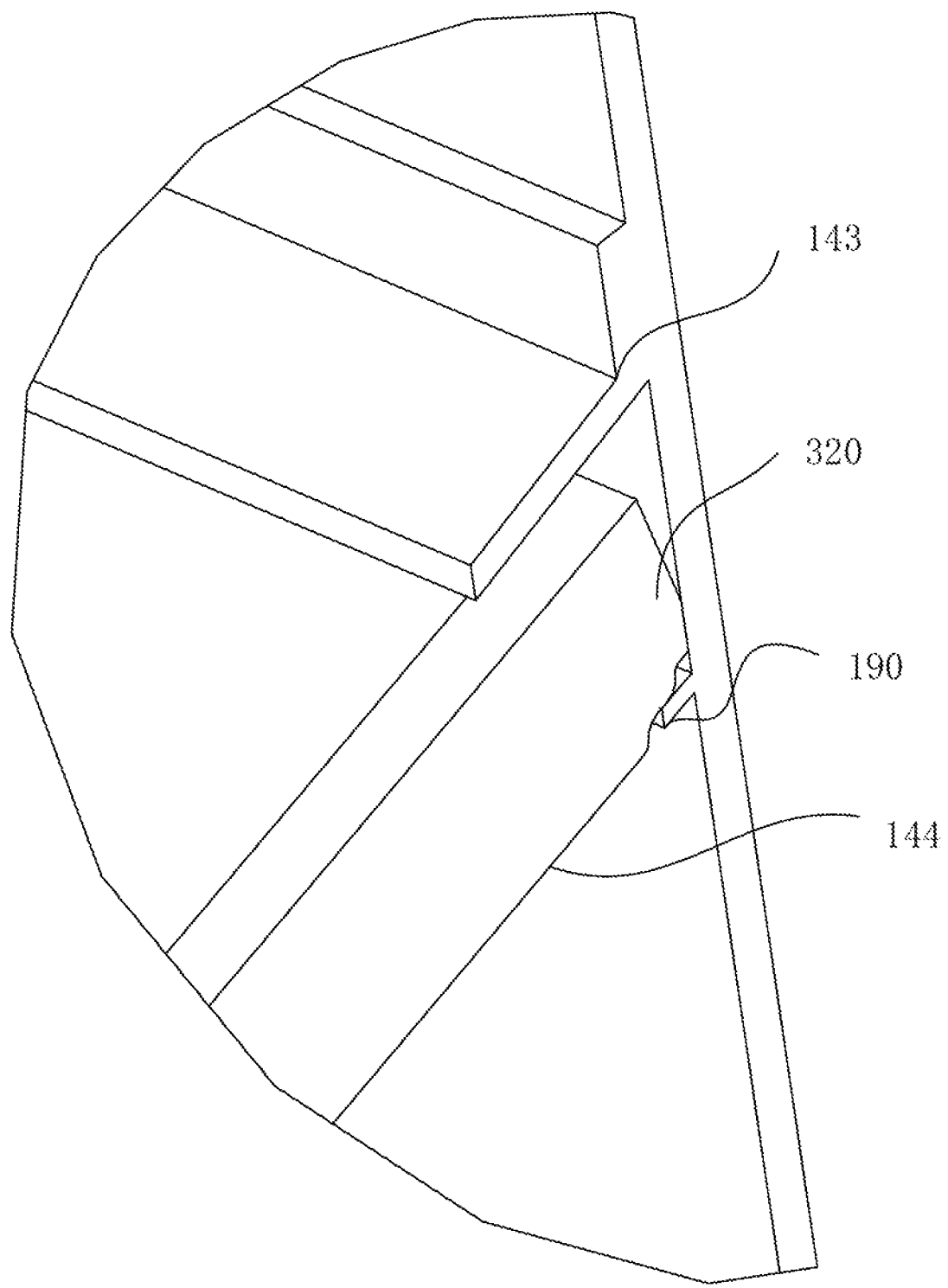
FIG. 7 is a partially enlarged view of a position A in FIG. 6 according to an embodiment of the present application.
Figure 8:
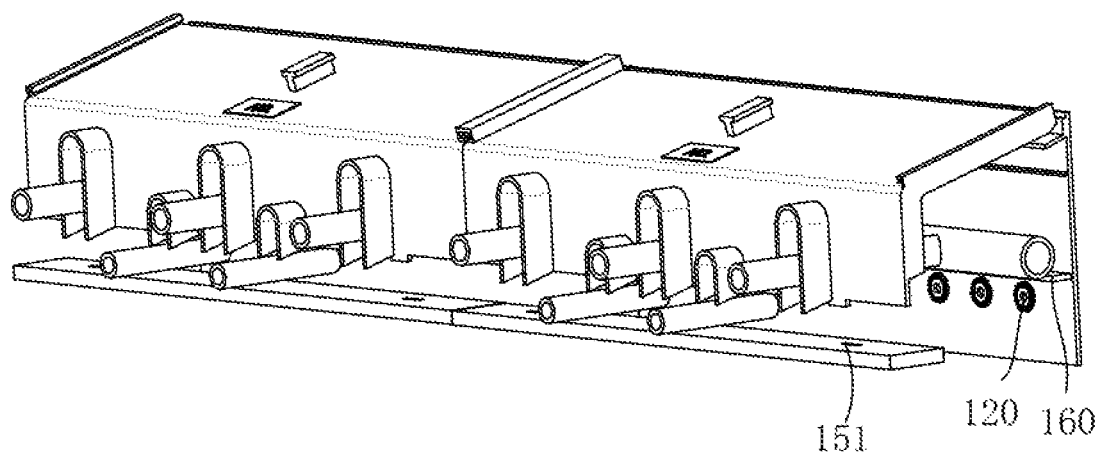
FIG. 8 is a schematic diagram of a waterproof structure mounting process according to an embodiment of the present application.

As shown in FIG. 1 to FIG. 8, an embodiment of the present application discloses a cleaning apparatus, including: a transmission assembly 110, transmitting a to-be-cleaned object; a drive assembly 119, connected to the transmission assembly 110, located lower than the transmission assembly 110 and on a side close to a side wall of the cleaning apparatus 100, and driving the transmission assembly 110, where the drive assembly 119 includes a gear assembly 120; a cleaning assembly 130, located higher than the transmission assembly 110, and cleaning the to-be-cleaned object; and a waterproof structure 140, located between the gear assembly 120 and the cleaning assembly 130, blocking the gear assembly 120, and preventing a cleaning agent from coming into contact with the gear assembly 120.

In a production process of a glass substrate of a panel, cleaning is required before coating of an alignment film, and during cleaning, the transmission assembly 110, the gear assembly 120, and the cleaning assembly 130 need to work together to complete a cleaning procedure. However, during cleaning, the cleaning agent may come into contact with the gear assembly 120, and scraps exist on a surface of the gear assembly 120. In this case, the scraps exist during recycling of the cleaning agent, and hinder the recycling of the cleaning agent, causing an increase in costs and a waste of the cleaning agent. However, when the waterproof structure 140 is disposed between the gear assembly 120 and the cleaning assembly 130, the waterproof structure 140 can block the gear assembly 120, so that the cleaning agent is not in contact with the gear assembly 120, and therefore is not mixed with the scraps, thereby helping the recycling of the cleaning agent and reducing costs.

In this embodiment, optionally, the cleaning apparatus 100 includes a machine platform 150, where the machine platform 150 is located lower than the transmission assembly 110 and inside the side wall of the cleaning apparatus 100, one end of the waterproof structure 140 is fixedly connected to the machine platform 150, and the other end of the waterproof structure 140 is fixedly connected to the side wall of the cleaning apparatus 100.

During cleaning of a display panel, operation of the cleaning apparatus 100 generates vibration. Therefore, mounting firmness is particularly important for such a mounting member as the waterproof structure 140. Considering that the machine platform 150 and the side wall relatively large in structure in the cleaning apparatus 100, in this solution, the waterproof structure 140 is fixedly connected to the side wall of the machine platform 150, so that the fixed waterproof structure 140 effectively blocks and covers the gear assembly 120, and the fixed waterproof structure 140 is relatively robust.

In this embodiment, optionally, the waterproof structure 140 includes a locking member 142 and at least two baffle plates 141, the baffle plates 141 are connected to each other and are mounted to the cleaning apparatus 100 in parallel, the at least two baffle plates 141 cover and are located higher than the gear assembly 120, and the locking member 142 is detachably connected to a position at which the baffle plates 141 are connected to each other.

Because the cleaning apparatus 100 is large, and a part of the waterproof structure 140 that mainly blocks and covers the gear assembly 120 is the baffle plate 141, if the baffle plate 141 is correspondingly designed to cover the gear assembly 120, the obtained baffle plate 141 is larger, and there are many inconveniences in mounting the baffle plate 141. If the baffle plate 141 is designed to be relatively small, and then the gear assembly 120 can be blocked and covered through engagement of the baffle plates 141 that are mounted to each other, mounting and disassembly operations can be facilitated. Therefore, the waterproof structure 140 designed in this solution includes at least two baffle plates 141. Because the baffle plates 141 are relatively small, it is convenient to mount and dismount the baffle plates 141. Considering that there may be a gap between the baffle plates 141, and the gap affects both tightness of the waterproof structure 140 and mounting firmness between the baffle plates 141, the locking member 142 is designed in this solution. The locking member 142 is connected between the baffle plates 141, thereby helping fix the baffle plates 141, filling the gap between the baffle plates 141, and preventing the cleaning agent from coming into contact with the gear assembly 120.

In this embodiment, optionally, the waterproof structure 140 includes a flow guide member 143, the flow guide member 143 is fixed to the side wall of the cleaning apparatus 100, the flow guide member 143 is located higher than a junction between the baffle plate 141 and the side wall that is of the cleaning apparatus 100 and to which the flow guide member 143 is fixed, and the flow guide member 143 blocks the junction to prevent the cleaning agent from infiltrating through the junction to come into contact with the gear assembly 120.

After the waterproof structure 140 is fixedly connected to the side wall of the cleaning apparatus 100, there may be a gap between the junction between the waterproof structure 140 and the side wall of the cleaning apparatus 100. As a result, the cleaning agent may come into contact with the gear assembly 120 through the gap, affecting the recycling of the cleaning agent, and causing wastes of materials and costs. However, when the flow guide member 143 is disposed at a position higher than the junction between the waterproof structure 140 and an inner wall, the flow guide member 143 can intercept the cleaning agent that may enter the gap and guide the cleaning agent to a recycling system, thereby saving materials and costs.

In this embodiment, optionally, the cleaning apparatus 100 includes a cleaning structure 160, the cleaning structure 160 is located higher than the gear assembly 120, and the cleaning structure 160 cleans the gear assembly 120.

During operation of the cleaning apparatus 100, the gear assembly 120 may have scraps on its surface due to abrasion. The scraps are not mixed with the cleaning agent for discharge, but accumulation of the scraps affects normal operation of the gear assembly 120. Therefore, in this solution, the cleaning structure 160 is disposed at a position higher than the gear assembly 120, and the cleaning structure 160 specifically cleans the scraps on the gear assembly 120. In this way, the normal operation of the gear assembly 120 is not affected.

In this embodiment, optionally, the cleaning apparatus 100 includes a waste drainage system 170 and a recycling system 180, the waste drainage system 170 is not in contact with the recycling system 180, the waste drainage system 170 is located lower than the gear assembly 120, and the recycling system 180 is located lower than the transmission assembly 110.

The cleaning agent can be recycled after cleaning a display panel, but the cleaning structure 160 does not need to recycle a mixture such as scraps obtained after cleaning the gear assembly 120. Therefore, the waste drainage system 170 and the recycling system 180 are designed in the cleaning apparatus 100 in this solution. The waste drainage system 170 is configured to discharge the mixture such as the scraps. The recycling system 180 is configured to perform recycling treatment on the cleaning agent after cleaning the display panel, for further use. Therefore, the waste drainage system 170 is disposed at a position lower than the gear assembly 120, the recycling system 180 is disposed at a position lower than the transmission assembly 110, and the waste drainage system 170 and the recycling system 180 cooperate with a due division of work, so that a waste discharge operation of the cleaning apparatus 100 is more efficient, the cleaning agent is saved, and wastes are avoided.

In this embodiment, optionally, the baffle plate 141 and the flow guide member 143 are made of hard plastic.

A use environment of the baffle plate 141 and the flow guide member 143 is to guide the cleaning agent. The cleaning agent is relatively small in amount, and therefore does not substantially constitute any destructive pressure on the flow guide member 143 in terms of weight. However, frequently existing in a humid environment, materials of the baffle plate 141 and the flow guide member 143 should have anti-static and anti-corrosion properties. In addition, after being mounted, the baffle plate 141 and the flow guide member 143 should not be easily deformed due to vibration caused by operation of the cleaning apparatus 100. Therefore, the baffle plate 141 and the flow guide member 143 need to have a particular hardness. Therefore, in this solution, the baffle plate 141 and the flow guide member 143 are made of hard plastic, so that a use condition can be satisfied. In addition, a production technology of the hard plastic is mature and costs are low.

In this embodiment, optionally, the waste drainage system 170 includes a second pipe 171 and a waste reservoir 172, the recycling system 180 includes a first pipe 181, a filter element 182, and a recycling tank 183, the second pipe 171 is connected to the waste reservoir 172, the first pipe 181 is connected to the recycling tank 183, and the filter element 182 is disposed in the first pipe 181.

After a display panel is cleaned, the cleaning agent can be filtered and recycled while gear scraps need to be discharged and are non-recycled. In this case, a treatment system needs to perform corresponding treatment on the two types of discharges. Therefore, in this solution, the recycling tank 183 is designed to be connected to the first pipe 181 to treat a recyclable discharge such as the cleaning agent, and the filter element 182 is disposed on the first pipe 181 to initially treat the cleaning agent. The cleaning agent filtered by the filter element 182 is discharged into the recycling tank 183 for post-treatment, and finally, a re-usable cleaning agent is obtained. The waste reservoir 172 is designed to be connected to the second pipe 171 to treat a non-recyclable discharge such as scraps, so that treatment efficiency can be improved, and wastes of the cleaning agent are reduced.

In this embodiment, optionally, the baffle plate 141 includes a first plate 300 and a second plate 400, an angle between the first plate 300 and the second plate 400 is greater than 90°, the first plate 300 is fixedly connected to the side wall of the cleaning apparatus 100, and an angle between the first plate 300 and the side wall of the cleaning apparatus 100 is greater than 90°; and the second plate 400 is fixedly connected to the machine platform 150, and an angle between the second plate 400 and the machine platform 150 is greater than or equal to 90°.

The cleaning agent blocked by the baffle plate 141 needs to flow toward an inner side direction of the side wall of the cleaning apparatus 100. Therefore, the angle between the first plate 300 and the second plate 400 of the baffle plate 141 designed in this solution is greater than 90°, the first plate 300 is fixedly connected to the side wall of the cleaning apparatus 100, the angle between the first plate 300 and the side wall of the cleaning apparatus 100 is greater than 90°, the second plate 400 is fixedly connected to the machine platform 150, and the angle between the second plate 400 and the machine platform 150 is greater than or equal to 90°. In this way, when the cleaning agent falls onto the baffle plate 141, the cleaning agent flows toward the inner side direction of the side wall of the cleaning apparatus 100, thereby flowing to the recycling system 180.

the machine platform 150 includes a groove 151, the second plate 400 includes a boss 410, the second plate 400 is fixedly connected to the machine platform 150, and the boss 410 is engaged with the groove 151; the side wall of the cleaning apparatus 100 includes a support bar 190, the support bar 190 is located higher than the gear assembly 120, and the support bar 190 protrudes from the inner side wall of the cleaning apparatus 100; and the waterproof structure 140 includes a reinforcing rib 144, the reinforcing rib 144 is located inside the waterproof structure 140, the reinforcing rib 144 is connected to both the first plate 300 and the second plate 400, the first plate 300 is fixedly connected to the side wall of the cleaning apparatus 100, and a part of the reinforcing rib 144 connected to the first plate 300 is fixedly engaged with the support bar 190.

Because the waterproof structure 140 is not integrated with the cleaning apparatus 100, if no special positioning design is used to locate the waterproof structure 140, a difficulty in fixing during mounting and security after mounting are not ensured. Considering that the positioning design should not affect normal operation of the cleaning apparatus 100, in this solution, the groove 151 is provided in an available space of the machine platform 150, and the boss 410 is design at a corresponding position that is in the second plate 400 and that is engaged with the groove 151. In this way, the second plate 400 can be fixed through engagement of the boss 410 and the groove 151. Then the support bar 190 is disposed on an inner side surface of the side wall of the cleaning apparatus 100, so that the first plate 300 can rest on the support bar 190, achieving a particular fixing effect on the first plate 300, and positioning of the baffle plate 141 during mounting is facilitated. In addition, because the first plate 300 and the second plate 400 are main plates for the baffle plates 141 and receive a particular force during operation, and a plate structure is easily deformed after receiving a force, fixing stability is affected. Therefore, the reinforcing rib 144 is designed to connect the first plate 300 and the second plate 400, so that the reinforcing rib 144 has a reinforcing effect on both the plates, and the baffle plate 141 is more stable in structure.

In this embodiment, optionally, a structure of a clamping groove 500 is designed on an end portion of the reinforcing rib 144 connected to the first plate 300, and when the first plate 300 is fixedly connected to the side wall of the cleaning apparatus 100, the clamping groove 500 is fixedly engaged with the support bar 190 disposed on an inner side face of the side wall of the cleaning apparatus 100.

If no positioning structure is designed for the first plate 300 when the first plate 300 is fixedly engaged with the support bar 190, the first plate 300 may be easily moved during mounting, and mounting and positioning are inconvenient. Considering that the support bar 190 protrudes from the inner side wall of the cleaning apparatus 100, in this solution, the clamping groove 500 is designed on the end portion of the reinforcing rib 144 connected to the first plate 300, and then the first plate 300 is mounted and located through engagement of the structure of the clamping groove 500 and the support bar 190. In addition, the reinforcing rib 144 is relatively stable in structure, and opening of the clamping groove in the reinforcing rib 144 does not affect the structure of the first plate 300. Engagement and fixing by using such a structure have low costs and large value.

In this embodiment, optionally, the cleaning apparatus 100 includes a pipe 200, the pipe 200 is located higher than the machine platform 150, the second plate 400 includes a pipe groove 420, the pipe groove 420 includes a groove wall, the groove wall protrudes from the outer side face of the first plate 300; and after the second plate 400 is fixedly mounted, the pipe 200 passes through the pipe groove 420, the groove wall covers an outer side of the pipe 200, and an outer surface of the pipe 200 is tangent to an inner surface of the groove wall.

Because the second plate 400 is fixed to the machine platform 150, and there are many pipes 200 at positions higher than the machine platform 150, in this solution, the pipe groove 420 is designed for the second plate 400, so that the pipe 200 passes through the pipe groove 420, and mounting and fixing of the second plate 400 are not affected by the pipe 200. After falling onto the baffle plate 141, the cleaning agent finally flows down along the second plate 400, and after the pipe groove 420 is engaged with the pipe, the pipe groove 420 between the pipe 200 and the machine platform 150 is not closed, the cleaning agent may come into contact with the gears through the pipe groove. Therefore, in this solution, the groove wall is designed to protrude from the outer side face of the first plate 300, so that a blocking are of the baffle plate 141 for the cleaning agent is increased, thereby effectively preventing the cleaning agent from coming into contact with the gear assembly 120.

In this embodiment, optionally, the first plate 300 includes a numbering structure 340 and a portable structure 350, the numbering structure 340 and the portable structure 350 are both located on an outer side face of the first plate 300, and the portable structure 350 is located in the middle of the first plate 300.

A fault may occur in the baffle plate 141 during use, and the waterproof structure 140 consists of many baffle plates 141. If a fault occurs in one of the baffle plates 141, a cleaner usually informs a maintenance technician to repair it. During maintenance, a worker needs to spend considerable time in finding the faulty baffle plate 141, causing a waste of time. In addition, considering that dismounting, mounting, and maintenance of the baffle plate 141 all need to move or carry the baffle plate 141, in this solution, the numbering structure 340 and the portable structure 350 are designed on the first plate 300. A number corresponding to each baffle plate 141 is etched on numbering structure 340. For the mounted baffle plate 141, the first plate 300 faces upward. Therefore, the numbering structure 340 is designed on the outer side face of the first plate 300, thereby facilitating etching and reading the number. Because the first plate 300 is on top, the portable structure 350 is designed on the outer side face of the first plate 300, thereby facilitating manual picking and placing. Because the baffle plate 141 is relatively uniform in structure and a center of gravity is near the middle position, the portable structure 350 is disposed at the middle position of the outer side face of the first plate 300, thereby facilitating carrying, picking, and placing operations.

In this embodiment, optionally, the first plate 300 includes a sliding track 330, a third end 310, and a fourth end 320, the locking member 142 includes a sliding slot 331, the sliding track 330 is located on the outer side face of the first plate 300, the sliding track 330 is disposed on the third end 310 and the fourth end 320 along a direction from the first plate 300 to the second plate 400, the sliding track 330 includes a first side face, the first side face of the sliding track 330 located on the third end 310 does not protrude from an end face of the third end 310, a first side face of the sliding track 330 located on the fourth end 320 does not protrude from an end face of the fourth end 320, and after the baffle plate 141 is fixedly mounted, the locking member 142 slidably connects the sliding track 330 at the third end 310 and the sliding track 330 at the fourth end 320 by using the sliding slot 331.

After the waterproof structure 140 is mounted, a third end 310 of a first plate 300 of one of the baffle plates 141 is connected to a fourth end 320 of a first plate 300 of a neighboring baffle plate 141. Tightness, fixing stability, and convenience of a fixing manner need to be considered for the connection between the baffle plates 141. Therefore, in this solution, the sliding track 330 is designed on the outer side face of the first plate 300, to facilitate fixed engagement with the locking member 142; the sliding track 330 designed on the third end 310 and the fourth end 320 of the first plate 300, the first side face of the sliding track 330 on the third end 310 is made not to protrude from the end face of the third end 310, and the first side face of the sliding track 330 on the fourth end 320 is made not to protrude from the end face of the fourth end 320, thereby ensuring tighter contact between two the baffle plate 141 and the first plate 300 and further tightness. In addition, when the sliding track 330 is engaged with the locking member 142 of the structure of the sliding slot 331, a contact rate is larger, so that the connection is firmer.

In this embodiment, optionally, the cleaning apparatus 100 includes a brush 600 and a cleaning agent cleaning section 700, both the brush 600 and the cleaning agent cleaning section 700 are located higher than the transmission assembly 110 and located inside the side wall of the cleaning apparatus 100, the brush 600 and the cleaning agent cleaning section 700 are disposed in parallel; and the brush 600 cooperates with the cleaning agent cleaning section 700 to clean the to-be-cleaned object.

In another embodiment of the present application, as shown in FIG. 3 to FIG. 8, a cleaning apparatus is disclosed, including: a transmission assembly 110, transmitting a to-be-cleaned object; a drive assembly 119, connected to the transmission assembly 110, located lower than the transmission assembly 110 and on a side close to a side wall of the cleaning apparatus 100, and driving the transmission assembly 110, where the drive assembly 119 includes a gear assembly 120; a cleaning assembly 130, located higher than the transmission assembly 110, and cleaning the to-be-cleaned object; and a waterproof structure 140, located between the gear assembly 120 and the cleaning assembly 130, blocking the gear assembly 120, and preventing a cleaning agent from coming into contact with the gear assembly 120.

The cleaning apparatus 100 includes a machine platform 150, where the machine platform 150 is located lower than the transmission assembly 110 and inside the side wall of the cleaning apparatus 100, one end of the waterproof structure 140 is fixedly connected to the machine platform 150, and the other end of the waterproof structure 140 is fixedly connected to the side wall of the cleaning apparatus 100.

The waterproof structure 140 includes a locking member 142 and at least two baffle plates 141, the baffle plates 141 are connected to each other and are mounted to the cleaning apparatus 100 in parallel, the at least two baffle plates 141 cover and are located higher than the gear assembly 120, and the locking member 142 is detachably connected to a position at which the baffle plates 141 are connected to each other.

The waterproof structure 140 includes a flow guide member 143, the flow guide member 143 is fixed to the side wall of the cleaning apparatus 100, the flow guide member 143 is located higher than a junction between the baffle plate 141 and the side wall that is of the cleaning apparatus 100 and to which the flow guide member 143 is fixed, and the flow guide member 143 blocks the junction to prevent the cleaning agent from infiltrating through the junction to come into contact with the gear assembly 120.

The baffle plate 141 includes a first plate 300 and a second plate 400, the first plate 300 includes a numbering structure 340 and a portable structure 350, the numbering structure 340 and the portable structure 350 are both located on an outer side face of the first plate 300, and the portable structure 350 is located in the middle of the first plate 300.

In a production process of a display panel, cleaning is required before coating of an alignment film, and during cleaning, the transmission assembly 110, the gear assembly 120, and the cleaning assembly 130 need to work together to complete a cleaning procedure. However, during cleaning, the cleaning agent may come into contact with the gear, and scraps exist on a surface of the gear. In this case, the scraps exist during recycling of the cleaning agent, and hinder the recycling of the cleaning agent, causing an increase in costs and a waste of the cleaning agent. However, when the waterproof structure 140 is disposed between the gear assembly 120 and the cleaning assembly 130, the waterproof structure 140 can block the gear assembly 120, so that the cleaning agent is not in contact with the gear assembly 120, and therefore is not mixed with the scraps, thereby helping the recycling of the cleaning agent and reducing costs. During cleaning of a display panel, operation of the cleaning apparatus 100 generates vibration. Therefore, mounting firmness is particularly important for such a mounting member as the waterproof structure 140. Considering that the machine platform 150 and the side wall relatively large in structure in the cleaning apparatus 100, in this solution, the waterproof structure 140 is fixedly connected to the side wall of the machine platform 150, so that the fixed waterproof structure 140 effectively blocks and covers the gear assembly 120, and the fixed waterproof structure 140 is relatively robust. Because the cleaning apparatus 100 is large, and a part of the waterproof structure 140 that mainly blocks and covers the gear assembly 120 is the baffle plate 141, if the baffle plate 141 is correspondingly designed to cover the gear assembly 120, the obtained baffle plate 141 is larger, and there are many inconveniences in mounting the baffle plate 141. If the baffle plate 141 is designed to be relatively small, and then the gear assembly 120 can be blocked and covered through engagement of the baffle plates 141 that are mounted to each other, mounting and disassembly operations can be facilitated. Therefore, the waterproof structure 140 designed in this solution includes at least two baffle plates 141. Because the baffle plates 141 are relatively small, it is convenient to mount and dismount the baffle plates 141. Considering that there may be a gap between the baffle plates 141, and the gap affects both tightness of the waterproof structure 140 and mounting firmness between the baffle plates 141, the locking member 142 is designed in this solution. The locking member 142 is connected between the baffle plates 141, thereby helping fix the baffle plates 141, filling the gap between the baffle plates 141, and preventing the cleaning agent from coming into contact with the gear assembly 120. After the waterproof structure 140 is fixedly connected to the side wall of the cleaning apparatus 100, there may be a gap between the junction between the waterproof structure 140 and the side wall of the cleaning apparatus 100. As a result, the cleaning agent may come into contact with the gear through the gap, affecting the recycling of the cleaning agent, and causing wastes of materials and costs. However, when the flow guide member 143 is disposed at a position higher than the junction between the waterproof structure 140 and an inner wall, the flow guide member 143 can intercept the cleaning agent that may enter the gap and guide the cleaning agent to a recycling system, thereby saving materials and costs. A fault may occur in the baffle plate 141 during use, and the waterproof structure 140 consists of many baffle plates 141. If a fault occurs in one of the baffle plates 141, a cleaner usually informs a maintenance technician to repair it. During maintenance, a worker needs to spend considerable time in finding the faulty baffle plate 141, causing a waste of time. In addition, considering that dismounting, mounting, and maintenance of the baffle plate 141 all need to move or carry the baffle plate 141, in this solution, the numbering structure 340 and the portable structure 350 are designed on the first plate 300. A number corresponding to each baffle plate 141 is etched on numbering structure 340. For the mounted baffle plate 141, the first plate 300 faces upward. Therefore, the numbering structure 340 is designed on the outer side face of the first plate 300, thereby facilitating etching and reading the number. Because the first plate 300 is on top, the portable structure 350 is designed on the outer side face of the first plate 300, thereby facilitating manual picking and placing. Because the baffle plate 141 is relatively uniform in structure and a center of gravity is near the middle position, the portable structure 350 is disposed at the middle position of the outer side face of the first plate 300, thereby facilitating carrying, picking, and placing operations.

In another embodiment of the present application, as shown in FIG. 1 to FIG. 9 a cleaning system 800 is disclosed, including a cleaning apparatus. The cleaning apparatus, including: a transmission assembly 110, transmitting a to-be-cleaned object; a drive assembly 119, connected to the transmission assembly 110, located lower than the transmission assembly 110 and on a side close to a side wall of the cleaning apparatus 100, and driving the transmission assembly 110, where the drive assembly 119 includes a gear assembly 120; a cleaning assembly 130, located higher than the transmission assembly 110, and cleaning the to-be-cleaned object; and a waterproof structure 140, located between the gear assembly 120 and the cleaning assembly 130, blocking the gear assembly 120, and preventing a cleaning agent from coming into contact with the gear assembly 120. assembly of the cleaning apparatus is not in contact with the cleaning agent.

The cleaning apparatus and the cleaning system 800 of the foregoing implementations may be applied to a suitable display panel or another suitable product.

The foregoing content is a further detailed description of the present application in combination with specific optional implementations, and it should not be considered that specific implementations of the present application are limited to the description. A person of ordinary skill in the technical field of the present application can further make several simple deductions or substitutions without departing from the idea of the present application, and all the deductions or substitutions shall be considered as falling within the protection scope of the present application.

What is claimed is:

1. A cleaning system, comprising a cleaning apparatus, the cleaning apparatus comprising:
   a transmission assembly, transmitting a to-be-cleaned object;
   a drive assembly, connected to the transmission assembly, located lower than the transmission assembly, and driving the transmission assembly;
   a cleaning assembly, located higher than the transmission assembly, and cleaning the to-be-cleaned object;
   a waterproof structure, located between the drive assembly and the cleaning assembly, blocking the drive assembly, and preventing a cleaning agent from coming into contact with the drive assembly;
   wherein the cleaning apparatus comprises a machine platform, the machine platform is located lower than the transmission assembly and inside a side wall of the cleaning apparatus, one end of the waterproof structure is fixedly connected to the machine platform, and the other end of the waterproof structure is fixedly connected to the side wall of the cleaning apparatus;
   wherein the waterproof structure comprises a locking member and at least two baffle plates, the baffle plates are connected to each other and are mounted to the cleaning apparatus in parallel, the baffle plates cover and are located higher than the drive assembly, and the locking member is detachably connected to a position at which the baffle plates are connected to each other.

2. The cleaning system according to claim 1, wherein the waterproof structure comprises a flow guide member, the flow guide member is fixed to the side wall of the cleaning apparatus, the flow guide member is located higher than a junction between the baffle plate and the side wall that is of the cleaning apparatus and to which the flow guide member is fixed, and the flow guide member blocks the junction to prevent the cleaning agent from infiltrating through the junction to come into contact with the drive assembly.

3. The cleaning system according to claim 1, wherein the cleaning apparatus comprises a cleaning structure, the cleaning structure is located higher than the drive assembly, and the cleaning structure cleans the drive assembly.

4. The cleaning system according to claim 3, wherein the cleaning apparatus comprises a waste drainage system and a recycling system, the waste drainage system is not in contact with the recycling system, the waste drainage system is located lower than the drive assembly, and the recycling system is located lower than the transmission assembly.

5. The cleaning system according to claim 4, wherein the waste drainage system comprises a second pipe and a waste reservoir, the recycling system comprises a first pipe, a filter element, and a recycling tank, the second pipe is connected to the waste reservoir, the first pipe is connected to the recycling tank, and the filter element is disposed in the first pipe.

6. The cleaning system according to claim 1, wherein the baffle plate comprises a first plate and a second plate, the first plate comprises a numbering structure and a portable structure, the numbering structure and the portable structure are both located on an outer side face of the first plate, and the portable structure is located in the middle of the first plate.

7. The cleaning system according to claim 6, wherein the baffle plate comprises the first plate and the second plate, an angle between the first plate and the second plate is greater than 90°, the first plate is fixedly connected to the side wall of the cleaning apparatus, and an angle between the first plate and the side wall of the cleaning apparatus is greater than 90°; and the second plate is fixedly connected to the machine platform, and an angle between the second plate and the machine platform is greater than or equal to 90°.

8. The cleaning system according to claim 6, wherein the machine platform comprises a groove, the second plate comprises a boss, the second plate is fixedly connected to the machine platform, and the boss is engaged with the groove; the side wall of the cleaning apparatus comprises a support bar, the support bar is located higher than the gear assembly, and the support bar protrudes from the inner side wall of the cleaning apparatus; and the waterproof structure comprises a reinforcing rib, the reinforcing rib is located inside the waterproof structure, the reinforcing rib is connected to both the first plate and the second plate, the first plate is fixedly connected to the side wall of the cleaning apparatus, and a part of the reinforcing rib connected to the first plate is fixedly engaged with the support bar.

9. The cleaning system according to claim 8, wherein a structure of a clamping groove is designed on an end portion of the reinforcing rib connected to the first plate, and when the first plate is fixedly connected to the side wall of the cleaning apparatus, the clamping groove is fixedly engaged with the support bar disposed on an inner side face of the side wall of the cleaning apparatus.

10. A cleaning apparatus, comprising:
a transmission assembly, transmitting a to-be-cleaned object;
a drive assembly, connected to the transmission assembly, located higher than the transmission assembly, and driving the transmission assembly;
a cleaning assembly, located higher than the transmission assembly, and cleaning the to-be-cleaned object;
a waterproof structure, located between the drive assembly and the cleaning assembly, blocking the drive assembly, and preventing a cleaning agent from coming into contact with the drive assembly; and
a machine platform, the machine platform being located lower than the transmission assembly and inside a side wall of the cleaning apparatus, one end of the waterproof structure being fixedly connected to the machine platform, and the other end of the waterproof structure being fixedly connected to the side wall of the cleaning apparatus, wherein
the waterproof structure comprises a locking member and at least two baffle plates, the at least two baffle plates are connected to each other and are mounted to the cleaning apparatus in parallel, the at least two baffle plates cover and are located higher than the drive assembly, and the locking member is detachably connected to a position at which the at least two baffle plates are connected to each other;
the waterproof structure comprises a flow guide member, the flow guide member is fixed to the side wall of the cleaning apparatus, the flow guide member is located higher than a junction between the baffle plate and the side wall that is of the cleaning apparatus and to which the flow guide member is fixed, and the flow guide member blocks the junction to prevent the cleaning agent from infiltrating through the junction to come into contact with the drive assembly; and
the baffle plate comprises a first plate and a second plate, the first plate comprises a numbering structure and a portable structure, the numbering structure and the portable structure are both located on an outer side face of the first plate, and the portable structure is located in the middle of the first plate.

* * * * *